(12) United States Patent
Stefina

(10) Patent No.: US 8,632,049 B2
(45) Date of Patent: Jan. 21, 2014

(54) SELF-RETAINING PLASTIC SNAP PLUGS

(75) Inventor: Brian K. Stefina, Waterford, MI (US)

(73) Assignee: BorgWarner Inc., Auburn Hill, MI (US)

( * ) Notice: Subject to any disclaimer, the term of this patent is extended or adjusted under 35 U.S.C. 154(b) by 676 days.

(21) Appl. No.: 12/734,543

(22) PCT Filed: Sep. 30, 2008

(86) PCT No.: PCT/US2008/011300
§ 371 (c)(1),
(2), (4) Date: May 7, 2010

(87) PCT Pub. No.: WO2009/073060
PCT Pub. Date: Jun. 11, 2009

(65) Prior Publication Data
US 2010/0230628 A1    Sep. 16, 2010

Related U.S. Application Data

(60) Provisional application No. 61/004,975, filed on Nov. 30, 2007.

(51) Int. Cl.
*F16K 31/00* (2006.01)
*B65D 51/16* (2006.01)
*B65D 45/00* (2006.01)

(52) U.S. Cl.
USPC ................... 251/62; 220/203.23; 215/280

(58) Field of Classification Search
USPC ........ 251/62, 63, 63.5; 220/203.23, 295, 302, 220/301; 215/282, 281, 280, 315, 311
See application file for complete search history.

(56) References Cited

U.S. PATENT DOCUMENTS

| | | |
|---|---|---|
| 3,910,314 A | 10/1975 | Nicholson |
| 4,471,940 A | 9/1984 | Zeuner et al. |
| 4,497,419 A * | 2/1985 | Reitzel ............. 220/302 |
| 5,167,340 A * | 12/1992 | Shaw .............. 220/295 |
| 5,193,575 A | 3/1993 | Do |
| 5,827,029 A * | 10/1998 | Denman ............ 411/373 |

FOREIGN PATENT DOCUMENTS

JP    2007002957    1/2007

OTHER PUBLICATIONS

Translation of JP 2007/002957A to Aisin Seiki, Published Jan. 11, 2007, translation performed on Jan. 29, 2013.*

* cited by examiner

*Primary Examiner* — John K Fristoe, Jr.
*Assistant Examiner* — Michael R Reid
(74) *Attorney, Agent, or Firm* — Warn Partners, P.C.

(57) ABSTRACT

A plug for closing off a bore of a hydraulic spool type valve is provided. The plug includes a polymeric body having a plurality of integral projecting studs which have a snap fit engagement with an inward radial protrusion of the bore within the hydraulic valve.

9 Claims, 2 Drawing Sheets

SELF-RETAINING PLASTIC SNAP PLUGS

CROSS-REFERENCE TO RELATED APPLICATIONS

This application is a National Stage of International Application No. PCT/US2008/011300, filed Sep. 30, 2008. This application claims priority to U.S. Patent Application No. 61/004,975 filed on Nov. 30, 2007. The disclosure of the above applications is incorporated herein by reference.

FIELD OF THE INVENTION

The field of the present invention is that of hydraulic valves, especially hydraulic valves utilized in fluid logic circuits.

BACKGROUND OF THE INVENTION

Hydraulic valves 6 (FIG. 1) used in hydraulic logic circuits typically have a cast valve body 8 with an extending machined multi-diameter bored passage 10. Positioned within the bored passage 10 is a spool type valve member 12. The bore is typically closed off by an aluminum plug 13. To hold the inserted plug 13 in position, a blocking plate or retainer clip 15 is utilized. It is desirable to provide a plug that does not require a blocking plate or retainer.

SUMMARY OF THE INVENTION

The present invention provides a plug for closing off a bore of a hydraulic spool type valve. The plug includes a polymeric body having a plurality of integral projecting studs which have a snap fit engagement with an inward radial protrusion of the bore within the hydraulic valve.

Additional features of the present invention will become more apparent to those skilled in the art as the invention is better described in the accompanying detailed description and drawings.

DETAILED DESCRIPTION OF THE DRAWINGS

Figure 1:
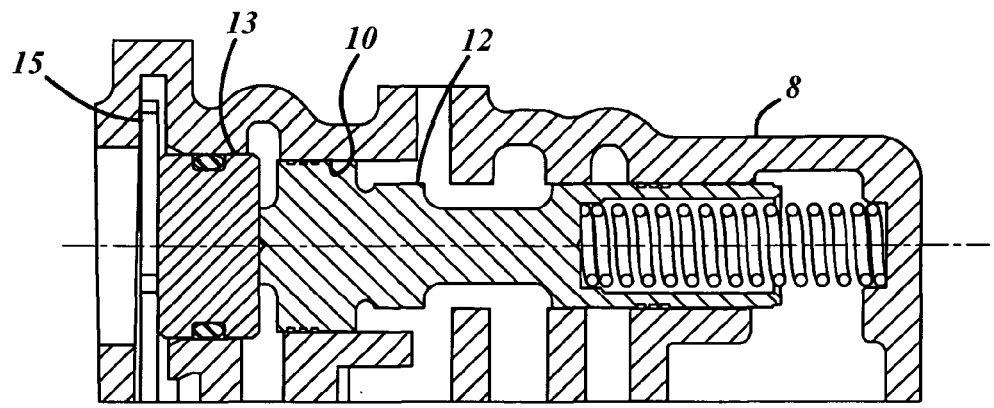
FIG. 1 is a sectional view of a valve body in a hydraulic logic circuit utilizing a plug prior to that of the present invention.
Figure 2:
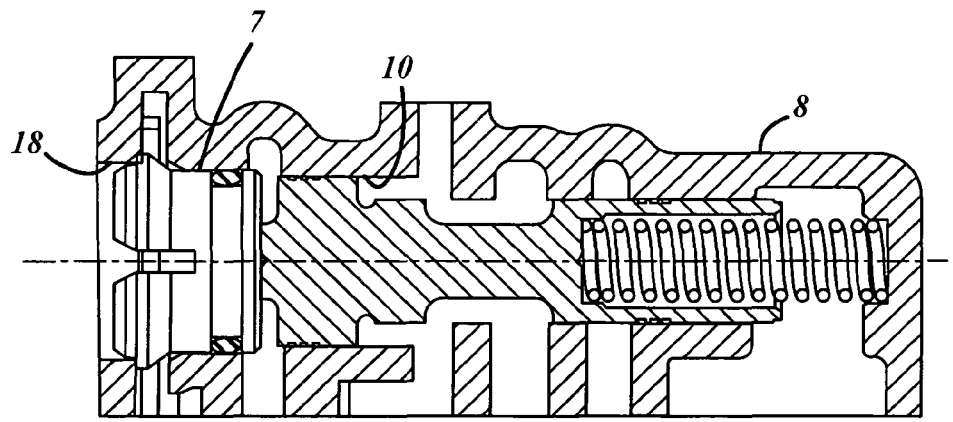
FIG. 2 is a view similar to that of FIG. 1 illustrating a hydraulic valve body utilizing a plug according to the present invention.
Figure 3:
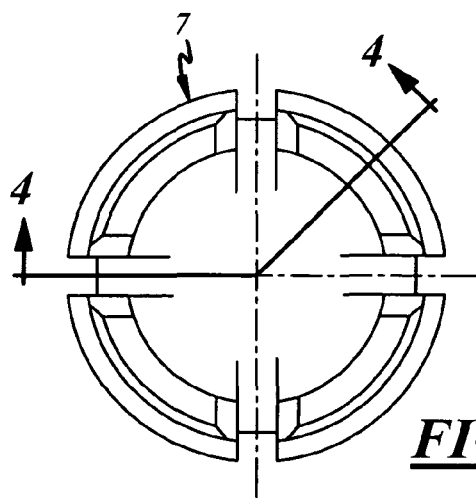
FIG. 3 is a top plan view of the plug shown in FIG. 2.
Figure 4:
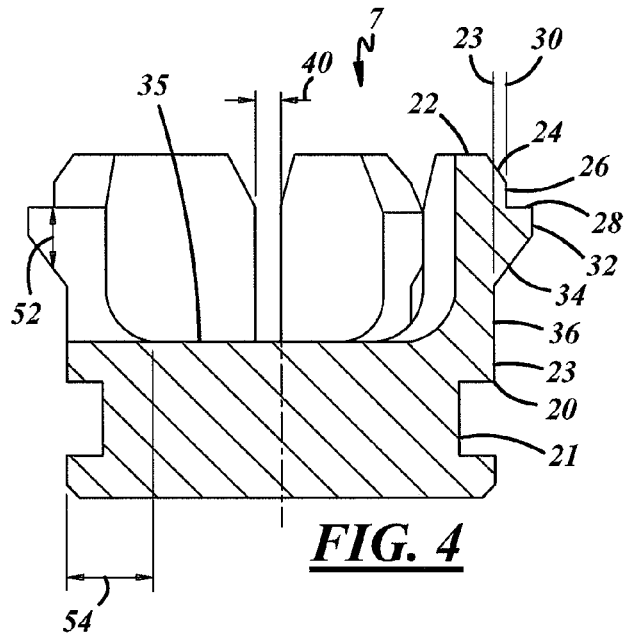
FIG. 4 is a sectional view taken along lines 4-4 of FIG. 3.
Figure 5:
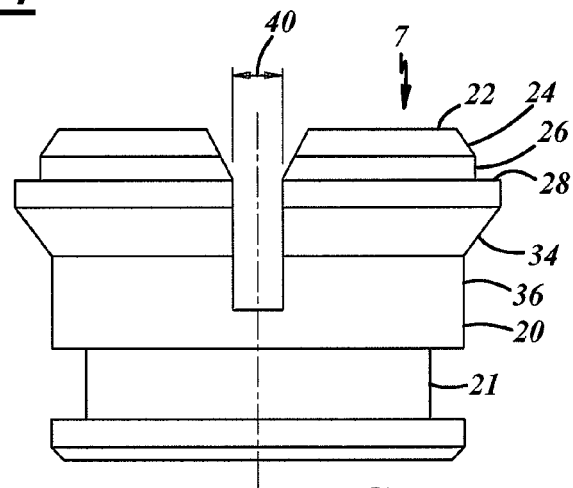
FIG. 5 is a plane elevational view of the plug shown in FIGS. 2-4.

Referring to FIGS. 2-5, a plug 7 (the lead line in FIGS. 4 and 5 also indicate a direction of insertion) of the present invention has a plug body 20. The plug body 20 is polymeric and is typically provided by a glass filled nylon or other suitable plastic having glass fiber reinforcements between 10% and 40% by weight. The plug body 20 has an annular groove 21 for receipt of an annular sealing member (not shown). Projecting integrally from the plug body 20 is a plurality of struts 22. The struts 22 have snap fit engagement with an inward radial protrusion 18 of the valve bore 10. The struts 22 on a forward an outer radial surface have a removal lead in 24 which that is angled radially outward in an installation direction. The removal lead in allows removal tooling to bend the struts 22 inward to allow removal of the plug 7. The removal lead in 24 will typically be at a 25° to 32° angle. The strut removal lead in 24 intersects a generally axial extending deflection limiter portion 26. The deflection limiter 26 outer diameter 30 is typically greater than the outer radial diameter 23 of the plug body. The deflection limiter 26 extends to a generally perpendicular landing 28 which interacts with the inward radial protrusion 18 of the valve bore. The generally perpendicular landing 28 in an installation direction is forward of the removal lead in 24.

Extending towards the plug body 20 from the landing 28 is an intersecting generally axial portion 32. The general axial portion 32 has a diameter greater than the second diameter or outer diameter of the deflection limiter 26. The generally axial portion 32 intersects an installation lead in 34. The installation lead in 34 is typically angled radially inward in an installation direction between 30° and 45° and in most instances is preferable to be between 30° and 40°. The installation lead in 34 intersects a portion of the strut having a diameter common with an outside diameter 23 of the body which is referred to as the stem 36. A gap 40 exists between the two adjacent struts 22. The gap 40 will preferably axially extend a length in the stem 36 that is equal to at least 30% of the axial length of an extreme end (an end away from strut removal lead in 24) of the slot 40 to the landing 28 to assure adequate flexibility of the strut during installation. The landing has an axial thickness 52 or length that is in most cases at least 35% of the radial width 54 of the strut taken along the generally inner radial floor 35 of the body. This ratio of the landing axial length to radial width helps to provide high breakout forces for the plug 7.

When installed, the valve body 20 has a clearance with the bore 10 which is 15% to 60% more in some applications than the clearance between the valve limiter 26 with the inward radial protrusion 18 of the bore. This causes the struts 22 to bend radially outward when fluid pressure is applied against the plug 7 further increasing the break out force of the plug 7.

In other applications, the valve body 20 has a slight interference with the bore 10. The interference fit can eliminate the need for the groove 21 and a sealing member.

Figure 6:
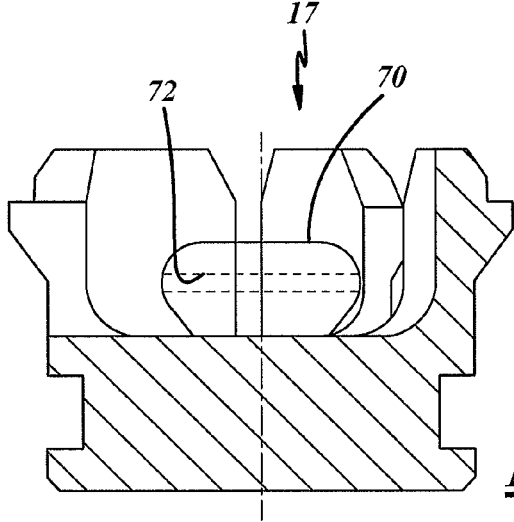
FIG. 6 is a view similar to FIG. 4 of an alternate preferred embodiment plug according to the present invention.

Referring to FIG. 6, a plug 7 has a mushroom 70 to allow tooling to get a grip on the plug 17 to pull it out for removal. The mushroom 70 can optionally have a through bore 72 to allow for a better grip for the removal tooling.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A plug for a bore of a hydraulic spool type valve, said plug comprising:
   a fiber reinforced plastic body having a first diameter, said body having an annular groove for receipt of a sealing member;
   a plurality of integral struts projecting from said body having a snap fit engagement with an inward radial protrusion of said bore, said struts having:
   an outer radial surface removal lead in, said removal lead in being angled radially outward in a direction of installation of said plug, and said struts having a generally axial deflection limiter intersecting said removal lead in, said deflection limiter being at a second diameter greater than said first diameter;

a generally perpendicular landing forward of said removal lead in a direction of installation of said plug, said perpendicular landing intersecting with said deflection limiter;

a generally axial portion intersecting with said landing said generally axial portion having a diameter greater than said second diameter;

an installation lead in intersecting said generally axial portion said installation lead in being angled radially inward in a direction of installation of said plug; and a stem portion at said first diameter.

2. A plug as described in claim 1 wherein said plug is made from a nylon glass filled plastic with glass fill between 10% and 40%.

3. A plug as described in claim 1 wherein said struts installation lead in is angled between 30 and 45 degrees.

4. A plug as described in claim 1 wherein said plug has a pull out member.

5. A plug as described in claim 1 wherein said struts removal lead in is angled between 25° and 32°.

6. A plug as described in claim 1 wherein a slot between said struts extends into said stem at least 30% of a length from said landing to an extreme end of said stem.

7. A plug as described in claim 1 wherein an axial length of said landing is at least 35% of a radial width of said strut adjacent an inner radial floor of said body.

8. A hydraulic module comprising:

a valve body with an extending bore, said bore having a radially inward protrusion;

a valve member slidably mounted within said bore;

a plug closing off said bore, said plug having a fiber reinforced plastic body having a first diameter, said body having an annular groove for reception of a sealing member;

a plurality of integral struts projecting from said body having a snap fit engagement with an inward radial protrusion of said bore, said struts having:

an outer radial surface removal lead in, said removal lead in being angled inward in a direction of installation of said plug and said struts having a generally axial deflection limiter intersecting said removal lead in, said deflection limiter being at a second diameter greater than said first diameter;

a generally perpendicular landing forward of said removal lead in in a direction of installation of said plug in, said perpendicular landing intersecting with said deflection limiter;

a generally axial portion intersecting with said landing, said generally axial portion having a diameter greater than said second diameter;

an installation lead in intersecting said generally axial portion, said installation lead in being angled radially inward in a direction of installation of said plug in; and a stem portion at said first diameter.

9. A hydraulic module as described in claim 8 wherein said plug body has a greater clearance with said bore than said deflection limiter has with said radial protrusion.

* * * * *

UNITED STATES PATENT AND TRADEMARK OFFICE
CERTIFICATE OF CORRECTION

PATENT NO. : 8,632,049 B2
APPLICATION NO. : 12/734543
DATED : January 21, 2014
INVENTOR(S) : Brian K. Stefina It is certified that error appears in the above-identified patent and that said Letters Patent is hereby corrected as shown below:

In the Claims

Column 2, lines 1 and 2
delete "a forward" and "which".

Signed and Sealed this
Fourteenth Day of October, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,632,049 B2 | Page 1 of 1 |
| APPLICATION NO. | : 12/734543 | |
| DATED | : January 21, 2014 | |
| INVENTOR(S) | : Brian K. Stefina | |

It is certified that error appears in the above-identified patent and that said Letters Patent is hereby corrected as shown below:

In the Specification

Column 2, lines 1 and 2
delete "a forward" and "which".

This certificate supersedes the Certificate of Correction issued October 14, 2014.

Signed and Sealed this
Eleventh Day of November, 2014

Michelle K. Lee
*Deputy Director of the United States Patent and Trademark Office*